Nov. 22, 1938.  H. J. MURPHY  2,137,542
RADIATOR GRILLE FASTENER
Filed Nov. 4, 1935
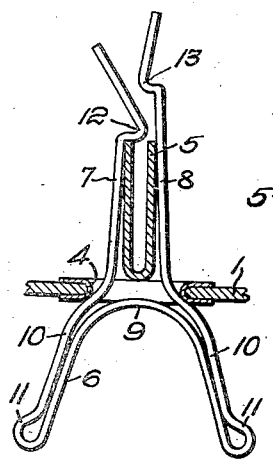
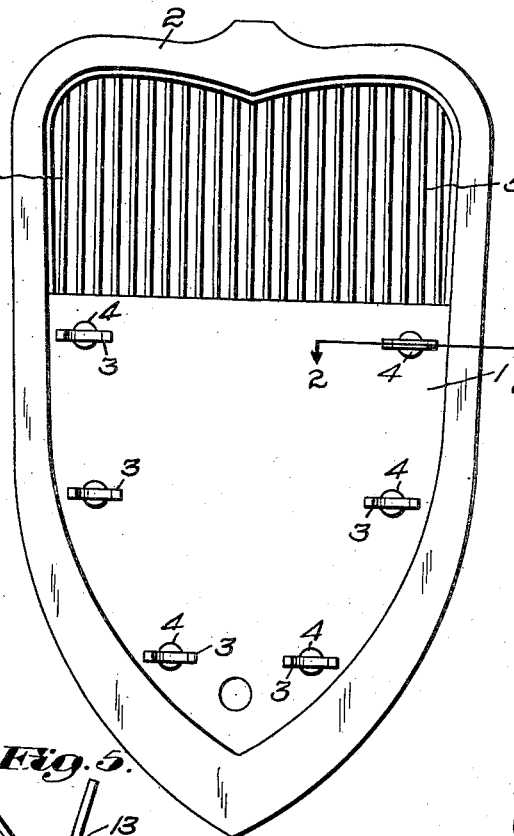
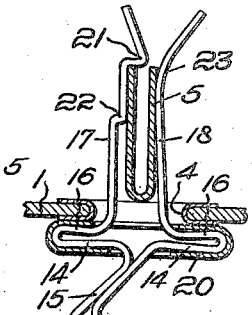
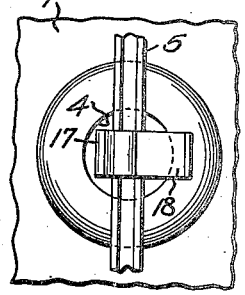
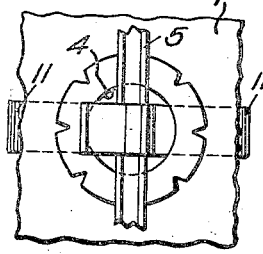
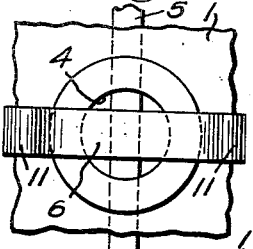
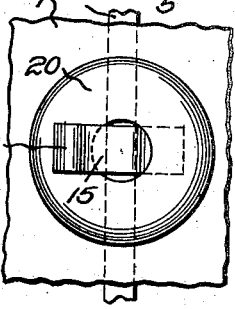
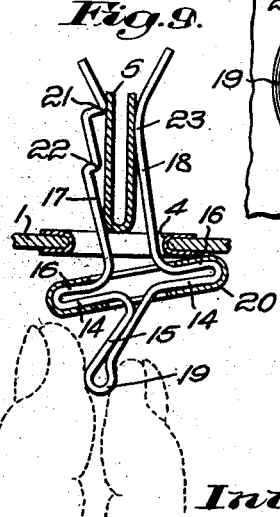
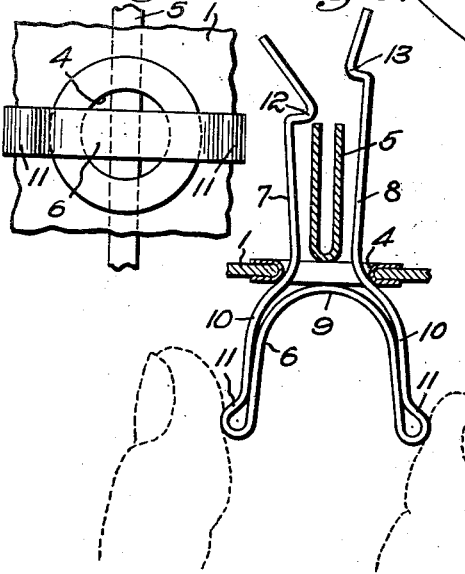
Inventor:
Howard J. Murphy,
by Walter J. Jones
Atty.

Patented Nov. 22, 1938

2,137,542

UNITED STATES PATENT OFFICE 2,137,542

RADIATOR GRILLE FASTENER

Howard J. Murphy, Greenwood, Mass., assignor to United-Carr Fastener Corporation, Cambridge, Mass., a corporation of Massachusetts Application November 4, 1935, Serial No. 48,163

4 Claims. (Cl. 24—255)

My invention relates to improvements in the fastening means used to secure a cover to an automobile radiator grille.

In the drawing which illustrates preferred forms of my invention:—

Figure 1 is a front view of a complete installation showing the use of my improved fasteners;

Fig. 2 is an enlarged section taken on the line 2—2 of Fig. 1;

Fig. 3 is an enlarged rear view of a fragment of the installation shown in Fig. 1, including one fastener and support and the adjacent part of the cover;

Fig. 4 is an enlarged front view of a fragment of the installation shown in Fig. 1;

Fig. 5 is a section showing the means of disengaging the fastener from its support with the operator's fingers shown by the dotted lines;

Fig. 6 is an installation in section including a second form of my improved fastener, a support and the adjacent part of the cover;

Fig. 7 is a rear view of the installation shown in Fig. 6;

Fig. 8 is a front view of the installation shown in Fig. 6; and

Fig. 9 is a section showing the means of disengaging the second form of my improved fastener from its support with the operator's fingers shown by the dotted lines.

The object of my invention is to provide a more useful fastener means for securing a flexible cover to an automobile radiator grille.

It has been found that the fasteners in present use for the purpose described have occasionally worked loose from their respective supports due to the many strains. Furthermore, these present fasteners can be pulled off quite readily and therefore it is relatively easy to steal the covers. It is the purpose of my present invention to provide a fastener which cannot become disengaged from its support unless a portion of the same is gripped by the fingers of an operator. I believe I have provided, by my present invention, a fastener of simple construction, which may be quickly installed and which once in engaged position is impossible of easy detachment except at the will of the operator.

Furthermore, my improved fastener, as set forth in this specification, is substantially universal in utility and, therefore, adapted to fit the majority of the present day automobile grilles for the purpose described.

Referring now to the accompanying drawing, I have shown in Fig. 1 a flexible cover 1 attached to an ornamental radiator grille 2 and covering as much of the grille as desired. The cover is secured to the grille by a plurality of fasteners 3 which are located in apertures 4 in the cover and engage the underlying bars 5, as best shown in Figs. 2 and 6.

Referring to the fastener unit itself, I have illustrated two forms in the drawing. The first form, represented by Figs. 2–5, is made of a single piece of spring metal which is bent into the shape most clearly illustrated in Fig. 2. The fastener comprises a head portion 6 and the yieldable arm portions 7 and 8. The head portion 6 is formed by bending the midportion of the material into the U-shaped formation 9 (Fig. 2), then folding the free ends 10—10 of the portion 9 outwardly and then inwardly to form finger grips 11—11 and finally continuing the free ends along the sides of the portion 9 and substantially adjacent thereto. At a common point below the portion 9 the free ends 10—10 converge slightly and then extend directly away from the head portion to form the yieldable arms 7 and 8.

At predetermined points on the arms 7 and 8, I have formed sharply angled shoulders represented on the drawing by the numerals 12 and 13. The shoulders 12 and 13 are located on their respective arms at unequal distances from the head portion so that it may be possible to securely engage bars of varying depths within the arms of the fastener. In Fig. 2 the bar 5 is illustrated to be of such depth that it is engaged by the shoulder 12. A bar of relatively greater depth (not shown) would be firmly engaged by the shoulder 13. The arms adjacent to the side of the shoulders away from the head portion are extended away from each other to provide a diverging surface for engagement with the grille bar.

To engage my fastener with a grille bar the V-shaped divergence of the free ends of the fastener arms is pushed against the proper bar with the result that the arms will be forced apart until the bar has passed the shoulder by which it is to be held in place, at which time the arms will spring together again.

As a result of the very abrupt shoulders which I have provided, the fastener can only be removed by gripping the head portion 6 as though to pull the fastener from its seat. By this gripping action the operator naturally contracts the sides of the U-shaped portion 9 together with their respective free end portions 10—10 and, as a result, the yieldable arms 7 and 8 are forced away from each other far enough to allow the engaged shoulder to be slipped over the support by a direct axial pull upon the fastener head.

In Figs. 6-9, I have illustrated a second form of fastener which is likewise used to secure a covering to an automobile grille by inserting the arms through an aperture in the covering to engage the underlying bars of the grille. The last mentioned fastener is made of a single strip of spring metal and comprises an elongated head portion 14 having an integral operating projection 15, the folded under portions 16—16 and the yieldable arm portions 17 and 18. The elongated portion 14 is formed from the midportion of the metal strip, the portions 16—16 adjacent to the ends of the elongated portion being folded under the elongated portion and extended inwardly toward the center. At a predetermined point the folded portions are bent outwardly directly away from the elongated portion 14 to form the arms 17 and 18.

The projection 15 is formed by extending a portion of the material out of the plane of the elongated portion, and at an angle thereto, for a predetermined distance and then folding the material back substantially upon itself and returning it to the plane of the elongated portion. In my preferred form I have formed the finger grip 19 at the outer end of the projection and have enclosed the entire head within a cap 20, the base of the cap having an aperture through which the projection 15 is extended.

At predetermined points on the arm 17 I have formed the relatively abrupt shoulder portions 21 and 22 which are located at spaced distances from the folded under portions so that it may be possible to engage supports of varying depths between the spring arms. My second form of fastener differs from the first in this respect because of the fact that, whereas the shoulders of my first form are on opposing arms, in my second form they are positioned on the same arm. The free end of the arm 17 extends away from the arm 18, and at a point 23 on the arm 18, I have bent the arm away from the arm 17, as shown in Fig. 6, the free ends of the two arms thereby providing a diverging surface when the bar 5 is entered between them.

When the bar 5 is engaged with my second form of fastener (Fig. 6) the spring arms 17 and 18 will bear firmly against the sides of the bar, one of the shoulders 21 firmly engaging an edge of the bar, as shown in Fig. 6. A bar of less depth than that illustrated in Fig. 6 might be engaged by the shoulder 22, but I have chosen to illustrate my invention by providing a bar of proper dimensions to be engaged by the shoulder 21. Because of the fact that the shoulders are formed with a very sharp angle, and in this way identical with the shoulders of my first form of fastener, the fastener is incapable of being dislodged from its seat except by will of the operator.

The disengagement of the fastener from the bar may be performed by the operator grasping the sloping projection 15, as shown in Fig. 9, and pulling upon the same. Due to the slope of the projection, the natural tendency is to exert pull pressure upon the projection laterally away from the shoulder arm 17 and during this action the bar will pivot upon the arm 18 thereby causing the arms to spread apart a sufficient distance to allow the engaged shoulder to slip over the bar so that the fastener may be entirely freed from its support. It is understood that in order that the fastener work correctly the projection 15 must slope toward the side of the fastener on which the shouldered arm 17 is located.

Although I have illustrated and described a preferred embodiment of my invention, I do not wish to be limited thereby because the scope of my invention is best defined by the following claims.

I claim:

1. A fastener unit formed from a strip of spring metal of considerably greater width than thickness, said fastener having a head formed from the mid-portion of said strip, said head comprising a U-shaped portion having opposed side walls, the free ends of said side walls folded back substantially adjacent to said side walls along the length of said side walls to a point beneath said U-shaped portion, a pair of opposed spring arms integral with and extending from said folded back portions directly away from said head portion, one of said opposed arms having a relatively abrupt shoulder portion located at a spaced distance from said head portion and adapted to engage a support of a certain dimension, the other of said arms having a relatively sharp shoulder portion located on its length at a position nearer to said head portion than the shoulder of said first arm, said other arm adapted to engage supports of lesser dimensions than those engaged by said first arm, the free ends of said arms diverging from their respective shoulders to provide surfaces for wedging the arms apart when a support is entered between said diverging portions, and said head portion so shaped and arranged that said arms may be forced away from each other by a pressure exerted inwardly upon each of the folded back portions and the respective side wall of said U-shaped portion whereby said fastener may be disengaged from said support.

2. A fastener unit formed from spring metal, said fastener unit having a head portion, a pair of yieldable arms extending from beneath said head portion for receiving a part between them to which the fastener is to be attached, at least one of said arms having an abrupt support-engaging shoulder spaced from said head and adapted to hold the fastener unit to a support against separation by an axial pull, the free end of at least one of said arms diverging from the other of said arms to provide a surface for wedging the arms apart when said part is entered between the free ends of said arms, and said head having a finger operative means through the operation of which at least one of said arms may be forced away from the other of said arms thereby permitting disengagement of said fastener from said part.

3. A fastener member of the class described, said fastener having a substantially flat elongated head portion with folded ends, a pair of yieldable arms extending from the inner ends of said folded portions, one finger operative projection only extending from said head portion in angular relation to the plane of said head portion, one of said arms having at least one shoulder extending toward the other of said arms, said shouldered arm underlying said angled projection.

4. A fastener unit formed from a strip of spring metal of considerably greater width than thickness, said fastener having an elongated flat head portion with folded ends, a finishing cap associated with said head portion, a loop-shaped projection formed integral with said head portion said loop-shaped portion extending in angular relation to said head portion, a pair of flat yieldable arms extending from the inner ends of said folded portions for receiving a part between them to which the fastener is to be attached, one of said arms having a pair of relatively abrupt shoulders extending toward the other of said arms, one of said shoulders adapted to engage said part, the other of said shoulders adapted to engage a support of different dimensions than that engaged by said first shoulder, the free ends of said arms diverging to provide surfaces for wedging the arms apart when the part to which said fastener is to be attached is entered between said diverging portions, and said engaged shoulder adapted to be moved laterally out of engagement with said part by a lateral tipping movement of said projection.

HOWARD J. MURPHY.